Figure 1:
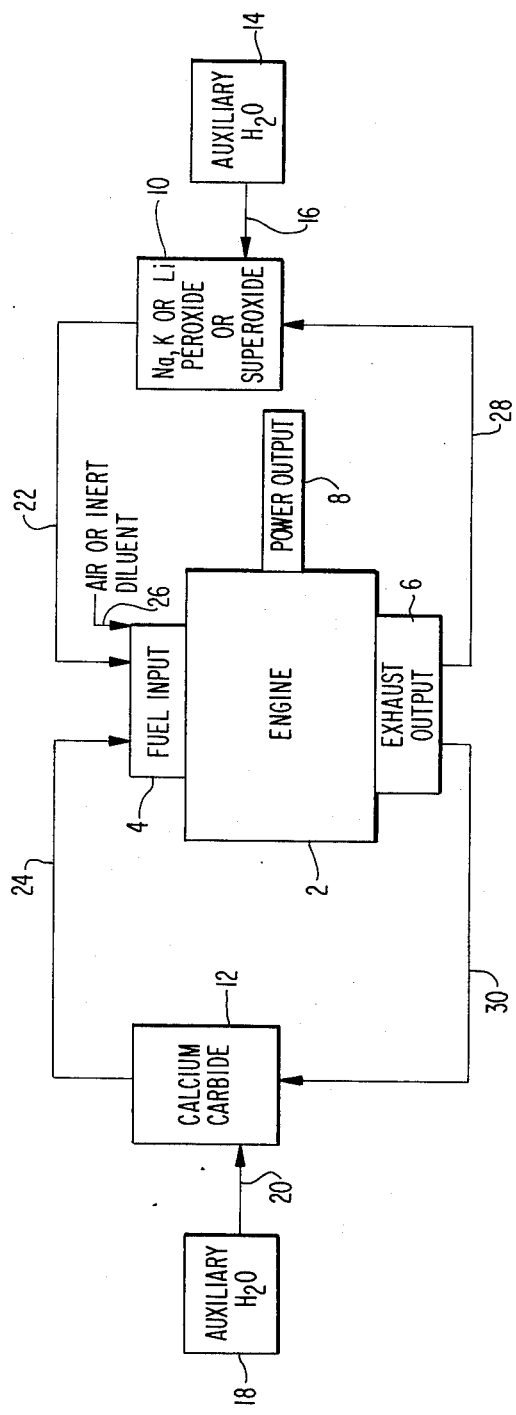

United States Patent [19]

Reynolds

[11] 3,982,391

[45] Sept. 28, 1976

[54] APPARATUS AND PROCESS FOR MECHANICAL POWER PRODUCTION BY ACETYLENE COMBUSTION

[76] Inventor: Orr E. Reynolds, 6828 Granby St., Bethesda, Md. 20034

[22] Filed: Sept. 20, 1974

[21] Appl. No.: 507,591

[52] U.S. Cl............................. 60/39.02; 60/39.12; 60/39.46 R
[51] Int. Cl.$^2$...................... F02B 43/00; F02C 3/20
[58] Field of Search............. 60/39.02, 39.06, 39.12, 60/39.46, 39.5, 282; 123/1 A

[56] References Cited
UNITED STATES PATENTS

| | | | |
|---|---|---|---|
| 2,017,481 | 10/1935 | Von Opel | 123/1 |
| 3,077,737 | 2/1963 | Silvern | 60/39.52 |
| 3,101,592 | 8/1963 | Robertson | 60/39.46 |
| 3,229,462 | 1/1966 | Fatica | 60/39.2 |
| 3,328,957 | 7/1967 | Rose | 60/39.46 |
| 3,658,043 | 4/1972 | Hoffman | 60/39.46 |
| 3,664,134 | 5/1972 | Seitz | 60/282 |
| 3,702,110 | 11/1972 | Hoffman et al. | 60/39.5 |

OTHER PUBLICATIONS

Leeds & Butterfield "Acetylene, Its Generation and Use," London 1903, pp. 20–23.

Primary Examiner—Carlton R. Croyle
Assistant Examiner—L. J. Casaregola
Attorney, Agent, or Firm—Morton, Bernard, Brown, Roberts & Sutherland

[57] ABSTRACT

Apparatus comprising a combustion engine having a combustion zone for burning acetylene with an oxygen-containing gas to produce mechanical power and exhaust gases including $H_2O$ and oxides of carbon, fuel input means, exhaust output means and power output means; a first structure defining a reaction zone containing a compound selected from the group consisting of sodium peroxide, potassium peroxide, lithium peroxide, sodium superoxide, potassium superoxide and lithium superoxide for reacting $H_2O$ with the compound to produce oxygen and for reacting oxides of carbon with by-products of the reaction of the $H_2O$ with the compound; a first conduit connecting the exhaust output means to the first structure for supplying exhaust gases, including $H_2O$ and oxides of carbon, thereto; a second conduit connecting the first structure to the fuel input means for supplying oxygen thereto; a second structure defining a reaction zone containing calcium carbide for reacting $H_2O$ with the calcium carbide to produce calcium oxide and acetylene and for reacting oxides of carbon with the calcium oxide; a third conduit connecting the exhaust output means to the second structure for supplying exhaust gases, including $H_2O$ and oxides of carbon, thereto; and a fourth conduit connecting the second structure to the fuel input means for supplying acetylene thereto. A novel process is also described for sustaining the production of mechanical power employing the novel apparatus.

17 Claims, 2 Drawing Figures

APPARATUS AND PROCESS FOR MECHANICAL POWER PRODUCTION BY ACETYLENE COMBUSTION

The present invention is directed to internal combustion engines and more particularly to an apparatus for, and a process of, producing combustion reactants for the operation of an internal combustion engine by treatment of combustion engine exhaust gases. In practicing the invention, combustion engine exhaust gases are delivered to two separate reaction zones for treatment. One reaction zone contains a compound which reacts with $H_2O$ from the exhaust gases to produce oxygen and also to produce by-products which react with oxides of carbon from the exhaust gases. The other reaction zone contains calcium carbide which reacts with $H_2O$ from the exhaust gases to produce acetylene and calcium oxide wherein the calcium oxide subsequently reacts with oxides of carbon from the exhaust gases. The oxygen and the acetylene which are produced are useful combustion reactants, i.e. fuel, and are delivered to an internal combustion for operation thereof.

The majority of internal combustion engines currently employed for operation of vehicles and the like operate on gasoline or diesel fuel and produce exhaust gases which are expurged to the atmosphere. These engines have series disadvantages which render them particularly undesirable. For example, the gasoline or diesel fuel upon which they are dependent has become very expensive and in recent times has also become unpredictably scarce. Moreover, gasoline is a highly explosive material which requires considerable care in storage and transport. Also, such engines exhaust significant quantities of harmful pollutants to the atmosphere. Catalytic converter devices have been developed to abate these harmful pollutants; however, the catalytic converters are not entirely successful, and in addition they are costly devices which increase operating costs and decrease engine efficiency.

The present invention is a novel apparatus and a novel process in which a combustion engine is operated with acetylene and oxygen combustion reactants to produce exhaust gases containing $H_2O$ and oxides of carbon which are delivered to reaction zones in which they are reacted to produce oxygen and acetylene for return to the combustion engine as fuel. The process permits operation of an engine with a fuel which is independent of gasoline shortages and the like, and the process includes consumption of substantial amounts of exhaust gases for generation of fuel for the engine, resulting in a significant reduction in exhaust gas pollution problems. The elements of the materials employed for production of fuel from the exhaust gases in the present invention are materials which are among the most abundant on earth, e.g. sodium peroxide and calcium carbide, and are non-explosive and easily stored. Thus, the present invention offers significant advantages over conventional gasoline-operated and diesel fuel-operated engines.

In one aspect, the invention is an apparatus comprising a combustion engine having a combustion zone for burning acetylene with an oxygen-containing gas to produce mechanical power and exhaust gases including $H_2O$ and oxides of carbon, fuel input means, exhaust output means and power output means; a first structure defining a reaction zone containing a compound selected from the group consisting of sodium peroxide, potassium peroxide, lithium peroxide, sodium superoxide, potassium superoxide and lithium superoxide for reacting $H_2O$ with the compound to produce oxygen and for reacting oxides of carbon with by-products of the reaction of the $H_2O$ with the compound; a first conduit connecting the exhaust output means to the first structure for supplying exhaust gases, including $H_2O$ and oxides of carbon, thereto; a second conduit connecting the first structure to the fuel input means for supplying oxygen thereto; a second structure defining a reaction zone containing calcium carbide for reaction $H_2O$ with the calcium carbide to produce calcium oxide and acetylene and for reacting oxides of carbon with the calcium oxide; a third conduit connecting the exhaust output means to the second structure for supplying exhaust gases, including $H_2O$ and oxides of carbon, thereto; and a fourth conduit connecting the second structure to the fuel input means for supplying acetylene thereto.

In another aspect, the present invention is directed to a process for sustaining the production of mechanical power which comprises burning acetylene with an oxygen-containing gas in a combustion zone of a combustion engine whereby exhaust gases including $H_2O$ and oxides of carbon are produced, the combustion engine having fuel input means, exhaust output means and power output means; supplying a portion of the exhaust gases from the exhaust output means to a first structure via a first conduit, the first structure defining a reaction zone and containing a compound selected from the group consisting of sodium peroxide, potassium peroxide, lithium peroxide, sodium superoxide, potassium superoxide and lithium superoxide; reacting $H_2O$ from the exhaust gases in the reaction zone of the first structure with the compound to produce oxygen and by-products and reacting the oxides of carbon from the exhaust gases with the by-products; supplying the oxygen from the first structure to the fuel input means via a second conduit; supplying another portion of the exhaust gases from the exhaust output means to a second structure via a third conduit, the second structure containing calcium carbide; reacting $H_2O$ from the exhaust gases in the second structure with the calcium carbide to produce acetylene and calcium oxide and reacting oxides of carbon with the calcium carbide; supplying the acetylene from the second structure to the fuel input means via a fourth conduit; feeding the oxygen and the acetylene from the fuel input means to the combustion zone; and burning the acetylene with the oxygen in the combustion zone for further production of mechanical power and exhaust gases.

The process and apparatus of the present invention is advantageously employed to drive motor vehicles and the like and may be employed as a drive means in any application in which engines are currently used. Thus, although the present invention is described in terms of producing mechanical power, this power may be used to drive vehicles or to operate other mechanical power devices, or it may be converted to other forms of power, e.g. by the operation of a dynamo to produce electrical power.

The apparatus of the present invention includes a combustion engine having a combustion zone for burning acetylene with an oxygen-containing gas to produce mechanical power and combustion products, i.e. exhaust gases, including $H_2O$ and oxides of carbon. The combustion engine may be one of those generally operated with gasoline or diesel fuel such as reciprocating or piston engines, rotary engines and turbine engines. Among these, the turbine engine may be preferred in combination with a constant speed wheel, although any of these engines may be employed. If commercially available gasoline or diesel engines are employed it should be noted that certain of these may be adapted for acetylene combustion but with an increased cooling capacity coolant system necessary to compensate for differences in heat evolution between gasoline and acetylene combustion.

The acetylene is burned in the combustion zone of the engine with an oxygen-containing gas and a start-up fuel supply may be used to initiate engine operation to produce exhaust gases from which more fuel may be produced. The start-up fuel may be fed to the engine from a supply separated from the acetylene produced from the exhaust gases, or acetylene produced from previous operation may be captured and stored for subsequent start-ups, or a combination of these may be used. When acetylene and/or oxygen previously produced from exhaust gases is stored for subsequent use, some additional fuel may be generated for start-up by the injection of $H_2O$ into the reaction zones in which acetylene and oxygen are produced. Regardless of the source of the acetylene used on start-up, the necessary oxygen may be stored oxygen produced for exhaust gases during previous operation, it may be oxygen supplied from a separate source, it may be oxygen contained in air fed to the fuel input means of the engine from the atmosphere, or it may be oxygen produced by $H_2O$ injection into the oxygen-producing reaction zone. In a preferred embodiment, $H_2O$ from an auxiliary supply is injected into both the acetylene-producing and the oxygen-producing reaction zones to produce start-up fuel and so the necessity for additional fuel storage is eliminated.

The oxygen used for acetylene combustion may generally be diluted, as may be the acetylene, and is generally supplied in the form of an oxygen-containing gas. Thus, an inert diluent gas may be mixed with the oxygen and acetylene, and therefore with the exhaust gases produced, to prevent an excessive or an undesirable amount of combustion in the engine. The diluent gas or gases may be any gas or mixture of gases which does not prevent operation of the invention and may be nitrogen, oxides of nitrogen, non-oxygen components of air or other inert gases. The diluent gas or gases may be maintained within the system, passing with the acetylene and oxygen into the combustion zone and passing with the exhaust gases produced by the combustion into the two reaction zones.

Exhaust gases including $H_2O$ and oxides of carbon exit the combustion zone of the engine through exhaust output means an portions are fed to structures which define reaction zones and contain materials which react with components of the exhaust gases to produce acetylene and oxygen.

A portion of the exhaust gases including $H_2O$ and oxides of carbon is supplied to a first structure via a first conduit primarily for the production of oxygen. The first structure defining a reaction zone contains a compound selected from the group consisting of sodium peroxide, potassium peroxide, lithium peroxide, sodium superoxide, potassium superoxide and lithium superoxide. The peroxide or superoxide reacts with the $H_2O$ from the exhaust gases to produce oxygen and hydroxide by-products. The hydroxide by-products react with the oxides of carbon to produce a carbonate and water. The oxygen, usually mixed with some minor amounts of non-reacted exhaust gases and optionally a minor or major amount of inert diluent gas, is supplied from the first structure defining a reaction zone to the fuel input means of the engine via a second conduit and is then delivered to the combustion zone for burning the acetylene to produce mechanical power and exhaust gases.

Another portion of the exhaust gases including $H_2O$ and oxides of carbon is supplied via a third conduit to a second structure defining a reaction zone and containing calcium carbide. The $H_2O$ from the exhaust gases reacts with the calcium carbide to form acetylene and calcium oxide, and the calcium oxide reacts with the oxides of carbon from the exhaust gases to form calcium carbonate. The acetylene produced is supplied to the fuel input means of the engine via a fourth conduit and is then delivered to the combustion zone for burning with the oxygen to produce mechanical power and exhaust gases.

The reactions occuring in the first structure, mentioned above, are typified by the following equations, using $Na_2O_2$ in the first structure for purposes of exemplification:

1. 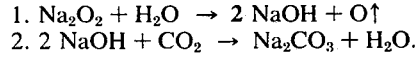 $Na_2O_2 + H_2O \rightarrow 2\ NaOH + O\uparrow$
2. $2\ NaOH + CO_2 \rightarrow Na_2CO_3 + H_2O$.

The principal reactions occuring in the second structure are exemplified as follows:

3. 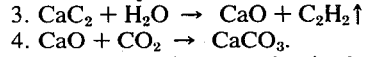 $CaC_2 + H_2O \rightarrow CaO + C_2H_2\uparrow$
4. $CaO + CO_2 \rightarrow CaCO_3$.

The basic reaction occuring in the combustion zone of the engine is:

5. 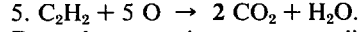 $C_2H_2 + 5\ O \rightarrow 2\ CO_2 + H_2O$.

Exemplary equations corresponding to equations (1) and (2) above, but using a superoxide instead of a peroxide, e.g. potassium superoxide, $KO_2$, are as follows:

6. 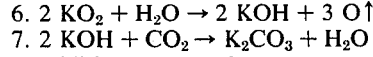 $2\ KO_2 + H_2O \rightarrow 2\ KOH + 3\ O\uparrow$
7. $2\ KOH + CO_2 \rightarrow K_2CO_3 + H_2O$ In addition, a secondary oxygen-producing reaction may occur in the first structure with the oxides of carbon and the superoxide, such as follows:

8. 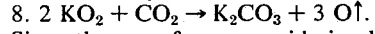 $2\ KO_2 + CO_2 \rightarrow K_2CO_3 + 3\ O\uparrow$.

Since the use of a superoxide in place of a peroxide results in greater amounts of oxygen production per mole, less superoxide than peroxide would be required to achieve a desired oxygen production output as illustrated by the above equations.

The oxygen-producing and the acetylene-producing structures to which the exhaust gases, including $H_2O$ and oxides of carbon, are supplied are generally non-corrosive closed structures having connecting conduits, e.g. non-corrosive piping or tubing, attached thereto. The materials of construction are a matter of engineering choice depending upon the desired life of construction versus costs, etc., but the structures may be made of stainless steel or other alloy suitable for elevated temperature use or may be of materials such as glasses, ceramics, cermets or other synthetic materials which will function for an acceptable duration.

In one embodiment the structures defining the oxygen-producing and acetylene producing reaction zones are canisters which may be refilled with appropriate reactants when the reactants have been consumed or substantially depleted. The structures, e.g. canisters may be removable from the apparatus for refilling or for replacement thereof, e.g. for reconstitution or rebuilding of used canisters, or may simply have removable parts for refilling. In one embodiment the structures contain perforated support means adapted to support the reactant material, i.e. the peroxide or superoxide compound or calcium carbide. The support means may be screens, perforated plates, channeling or other equivalently functional device, and the supported reactant may be in particulate form, e.g. pellets, beads, rods, etc., or may be in sheet form or in coated form.

Since the oxygen-producing and the acetylene-producing reactions may proceed at different reaction rates it is desirable to design the support means of each structure so as to achieve oxygen and acetylene production rates in desired proportion to one another. It is desirable to produce oxygen in approximately stoichiometric or in slightly excess of stoichiometric amounts to assure substantially complete combustion of the acetylene while avoiding excessive amounts of oxygen in the exhaust gases. The particular choice of support means, size and reactant amount are dependent upon the form of the reactant material, i.e. reactant material surface area, purity and shape, and upon the desired range between refills.

In one embodiment the exhaust gases are passed through an afterburner prior to being supplied to the oxygen-producing and the acetylene-producing structures to assure substantially complete combustion of residual acetylene, i.e. unburned, and consumption of oxygen remaining in the exhaust gases. This is useful in avoiding harmful amounts of acetylene being supplied to the peroxide, or superoxide, structure and harmful amounts of oxygen being supplied to the calcium carbide structure.

In the accompanying drawings, two illustrative embodiments of the present invention are illustrated diagramatically for purposes of example.

FIG. 1 shows an engine 2 for producing mechanical power and having fuel input means 4, exhaust output means 6 and power output means 8. Canister 1 contains sodium, potassium or lithium peroxide or superoxide and canister 12 contains calcium carbide. The engine is initially started by injecting $H_2O$ from auxiliary $H_2O$ supply 14 via inlet means 16 to canister 10 and by injecting $H_2O$ from auxiliary $H_2O$ supply 18 via inlet means 20 to canister 12. $H_2O$ reacts with the compound in canister 10 to produce oxygen according to the reaction equation such as equations (1) and (7) above, and the oxygen is supplied to fuel input means 4 via conduit line 22. Likewise, $H_2O$ reacts with the calcium carbide in canister 12 to produce acetylene according to equation (4) above, and the acetylene is supplied to fuel input means 4 via conduit line 24. The oxygen and acetylene mix in the fuel input means, and air or an inert diluent gas (depending upon the amount of $H_2O$ injected into canister 10 and concomitant need or lack of need for additional oxygen) is added via line 26. The acetylene is burned with the oxygen-containing gas in the engine to produce mechanical power at power output means 8 and to produce exhaust gases including $H_2O$ and oxides of carbon at exhaust output means 6. Portions of the exhaust gases are supplied to canisters 10 and 12 via conduit lines 28 and 30, respectively, for reaction according to the above equations to produce oxygen in canister 10 and acetylene in canister 12. The acetylene and oxygen are returned to the fuel input means 4 via their respective conduit lines and then combusted to sustain the production of mechanical power. While the embodiment of FIG. 1 is complete in its essential aspects, the drawing does not illustrate conventional carburation and fuel line control mechanisms which are apparent to a skilled artisan.

Figure 2:
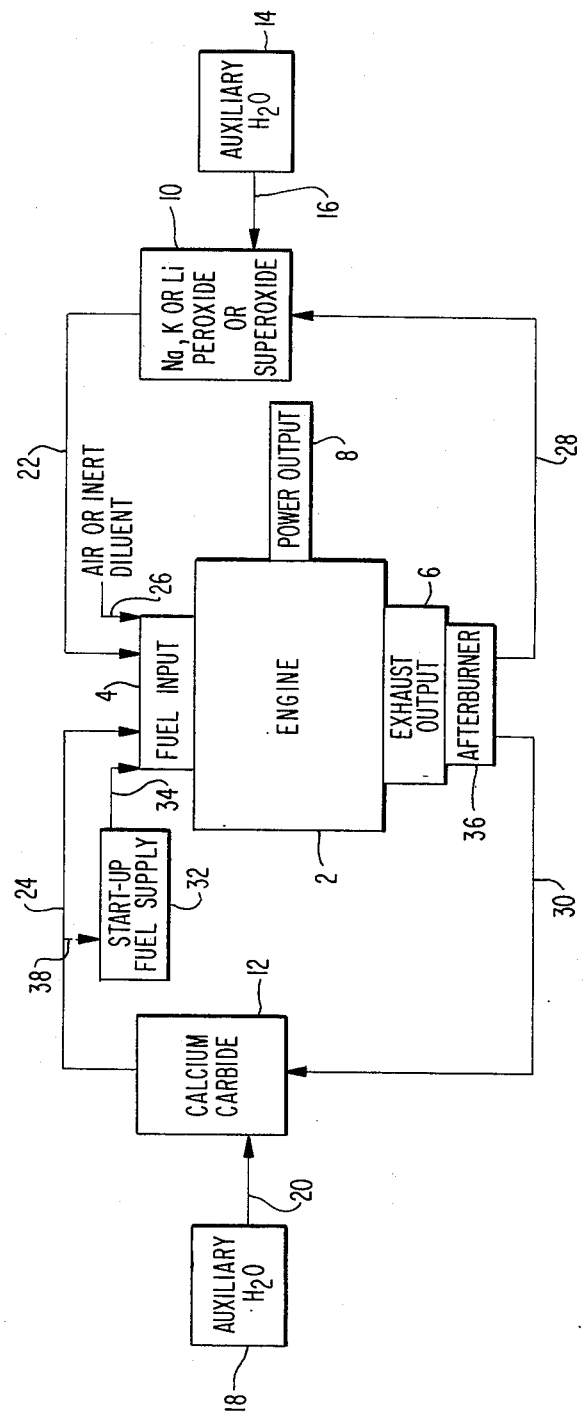

FIG. 2 illustrates another embodiment of the present invention similar in part to that in FIG. 1, and like parts are identically numbered. The engine in FIG. 2 is operated in the same manner as the engine in FIG. 1 except that start-up is effected by supplying acetylene from start-up fuel supply 32 to fuel input means 4 via conduit line 34, e.g. with a pump (not shown), and adding air from line 26. The acetylene and oxygen-containing gas, i.e. air, mix in fuel input means 4, and combustion is effected in the combustion zone of engine 2. The exhaust gases pass from exhaust output means 6 to afterburner 36 for substantially complete combustion of residual acetylene and oxygen prior to being supplied to canisters 10 and 12. The apparatus is otherwise operated as described with respect to the apparatus of FIG. 1. Optional auxiliary $H_2O$ may be supplied from supplies 14 and 18 to their respective canisters, e.g. during start-up or to aid in production of acetylene and/or oxygen as desired. When the engine is shut off, acetylene produced from the last quantities of exhaust gases applied to canister 12 may be captured and stored in fuel supply 32 via line 38 with conventional valve switching means (not shown).

To test the process of the present invention an apparatus was constructed using a 2 cycle, approximately 2 hp. lawnmower type engine. A canister containing calcium carbide was attached by a tubing to the fuel intake line of the engine and a canister containing sodium peroxide was also attached by tubing to the fuel intake line. The exhaust line was connected by tubing to the ends of the canisters opposite the ends attached to the fuel intake line. The apparatus arrangement is exemplified by FIG. 1 and was operated in the manner described in conjunction with FIG. 1. Water was injected into both canisters and air was permitted to flow into the engine during start-up. The engine ran for over 30 minutes without fuel other than that produced by the canisters. Operation of the engine was smooth but eventual over-heating was observed, indicating that an improved cooling system may be needed due to the excessive heat of combustion evolved when burning acetylene instead of gasoline.

What is claimed is:
1. An apparatus, comprising:
   a. a combustion engine having a combustion zone for burning acetylene with an oxygen-containing gas to produce mechanical power and exhaust gases including $H_2O$ and oxides of carbon, the combustion engine including fuel input means, exhaust output means and power output means;
   b. a first structure defining a reaction zone for containing a compound selected from the group consisting of sodium peroxide, potassium peroxide, lithium peroxide, sodium superoxide, potassium superoxide and lithium superoxide for reacting $H_2O$ with the compound to produce oxygen and for reacting oxides of carbon with by-products of the reaction of the $H_2O$ with the compound;
   c. a first conduit connecting the exhaust means to the first structure for supplying exhaust gases, including $H_2O$ and oxides of carbon, thereto;
   d. a second conduit connecting the first structure to the fuel input means for supplying oxygen thereto;
   e. a second structure defining a reaction zone for containing calcium carbide for reacting $H_2O$ with the calcium carbide to produce a product consisting essentially of calcium oxide and aceytlene and for reacting oxides of carbon with the calcium oxide;

f. a third conduit connecting the exhaust means to the second structure for supplying exhaust gases, including $H_2O$ and oxides of carbon, thereto; and g. a fourth conduit connecting the second structure to the fuel input means for supplying acetylene thereto.

2. The apparatus of claim 1 wherein the combustion engine is a reciprocating engine.

3. The apparatus of claim 1 wherein the first structure and the second structure are refillable canisters.

4. The apparatus of claim 1 further including an auxiliary $H_2O$ supply and inlet means attaching the auxiliary $H_2O$ supply to the first structure.

5. The apparatus of claim 4 further including additional inlet means attaching the auxiliary $H_2O$ supply to the second structure.

6. The apparatus of claim 4 further including a second auxiliary $H_2O$ supply and second inlet means attaching the second auxiliary $H_2O$ supply to the second structure.

7. The apparatus of claim 1 further including an auxiliary $H_2O$ supply and inlet means attaching the auxiliary $H_2O$ supply to the second structure.

8. A process for sustaining the production of mechanical power comprising:

a. burning acetylene with an oxygen-containing gas in a combustion zone of a combustion engine whereby mechanical power is produced and whereby exhaust gases including $H_2O$ and oxides of carbon are produced, the combustion engine having fuel input means, exhaust output means and power output means;

b. supplying a portion of the exhaust gases from the exhaust output means to a first structure via a first conduit, the first structure defining a reaction zone and containing a compound selected from the group consisting of sodium peroxide, potassium peroxide, lithium peroxide, sodium superoxide, potassium superoxide and lithium superoxide;

c. reacting $H_2O$ from the exhaust gases in the reaction zone of the first structure with the compound to produce oxygen and by-products and reacting the oxides of carbon from the exhaust gases with the by-products;

d. supplying the oxygen from the first structure to the fuel input means via a second conduit;

e. supplying another portion of the exhaust gases from the exhaust output means to a second structure via a third conduit, the second structure containing calcium carbide;

f. reacting $H_2O$ from the exhaust gases in the second structure with the calcium carbide to produce a product consisting essentially of acetylene and calcium oxide and reacting oxides of carbon with the calcium oxide;

g. supplying the acetylene from the second structure to the fuel input means via a fourth conduit;

h. feeding the oxygen and the acetylene from the fuel input means to the combustion zone; and i. burning the acetylene with the oxygen in the combustion zone for further production of mechanical power and exhaust gases.

9. The process of claim 8 wherein the reactions in the first structure are supplemented by the addition of $H_2O$ from an auxiliary supply.

10. The process of claim 8 wherein the reactions in the second structure are supplemented by the addition of $H_2O$ from an auxiliary supply.

11. The process of claim 8 wherein the combustion engine is a reciprocating engine.

12. The process of claim 8 further including diluting the exhaust gases, the oxygen and the acetylene with an inert diluent gas.

13. The process of claim 8 wherein the exhaust gases are passed through an afterburner to assure substantially complete combustion of residual acetylene and oxygen in the exhaust gases prior to being supplied to the first structure and second structure.

14. The apparatus of claim 1 wherein the combustion engine is a rotary engine.

15. The apparatus of claim 1 wherein the combustion engine is a turbine engine.

16. The process of claim 8 wherein the combustion engine is a rotary engine.

17. The process of claim 8 wherein the combustion engine is a turbine engine.

* * * * *